(12) United States Patent
Nishino et al.

(10) Patent No.: US 6,879,261 B2
(45) Date of Patent: Apr. 12, 2005

(54) OPERATOR PRESENCE SENSING APPARATUS FOR A SEAT OF A VEHICLE

(75) Inventors: Akifumi Nishino, Sakai (JP); Ryuji Kitagawa, Sakai (JP); Kenzo Ushiro, Sakai (JP); Hiroki Fukudome, Sakai (JP)

(73) Assignee: Kubota Corporation, Osaka (JP)

(*) Notice: Subject to any disclaimer, the term of this patent is extended or adjusted under 35 U.S.C. 154(b) by 39 days.

(21) Appl. No.: 10/393,382

(22) Filed: Mar. 20, 2003

(65) Prior Publication Data

US 2004/0090338 A1 May 13, 2004

(30) Foreign Application Priority Data

Nov. 11, 2002 (JP) ........................................ 2002-326660

(51) Int. Cl.⁷ ............................................. G08B 21/00
(52) U.S. Cl. ........................ 340/666; 340/665; 340/667
(58) Field of Search ................................ 340/666, 667, 340/668, 687, 426.1

(56) References Cited

U.S. PATENT DOCUMENTS

| | | | |
|---|---|---|---|
| 4,361,741 A | * 11/1982 | Leskoverc et al. | ........ 200/85 A |
| 4,795,865 A | * 1/1989 | Howard | .................... 200/85 A |
| 5,481,078 A | 1/1996 | Asche | |
| 5,565,829 A | * 10/1996 | Loraas et al. | ............... 335/205 |
| 5,991,676 A | 11/1999 | Podoloff et al. | |
| 6,448,512 B1 | * 9/2002 | Cooper | ........................ 177/144 |

FOREIGN PATENT DOCUMENTS

| | | |
|---|---|---|
| JP | 08-099559 | 4/1996 |
| JP | 09-121661 | 5/1997 |

* cited by examiner

Primary Examiner—Daniel Wu
Assistant Examiner—Son Tang
(74) Attorney, Agent, or Firm—Webb Ziesenheim Logsdon Orkin & Hanson, P.C.

(57) ABSTRACT

An operator presence sensing apparatus for a seat of a vehicle includes a base member (7, 8) for supporting the seat (6), and a relay member (9) extending vertically between the base member and the seat. The seat is oscillatable about a pivot axis (X) extending in a transverse direction in the base member. The relay member is pivotably supported at one end thereof by the pivot axis and at the other end by the base member through a cushion spring (10). A seat lift-up spring (12) is disposed between an underside of the seat and the base member for receiving part of the weight of the seat. The seat unoccupied by the operator is oscillated to a floating position lifted from the relay member by the lift-up spring. The apparatus further comprises an operator presence sensing switch (13) for detecting the seat occupied by the operator and oscillated from the floating position to a lower seated position, and a restricting device (14, 15a) for restricting the relay member oscillating upward by action of the cushion spring when the seat is not occupied by the operator.

6 Claims, 8 Drawing Sheets

OPERATOR PRESENCE SENSING APPARATUS FOR A SEAT OF A VEHICLE

BACKGROUND OF THE INVENTION

1. Field of the Invention

The present invention relates to an operator presence sensing apparatus for a seat of a vehicle, the apparatus being operable for generating a signal when the driver (operator) takes or leaves the seat.

2. Description of the Related Art

With an operator presence sensing apparatus for a seat of a vehicle known from Japanese Patent Unexamined Publication No. 8-99559, the seat is pivotable about a pivot axis extending transversely thereof and provided in a base member supporting the seat. Also, this conventional apparatus comprises a relay member extending vertically between the base member and the seat, and a seat lift-up spring disposed between the base member and an underside of the seat for receiving part of the weight of the seat. The relay member is pivotably supported at one end thereof by the pivot axis and at the other end by the base member through a cushion spring. The seat, when unoccupied by the operator, is pivoted by the lift-up spring to a floating position above the relay member. An operator presence sensing switch is provided in the relay member for detecting that the seat occupied by the operator has pivoted from the floating position to a lowered seated position. The cushion spring, seat lift-up spring and operator presence sensing switch are aligned longitudinally of the vehicle. The operator presence sensing switch detects presence or absence of the operator on the driver's seat. Unless presence of the operator is detected, an engine is not started, or is stopped if it is running.

However, with such a conventional operator presence sensing apparatus, a pivoting range of the relay member is not taken into consideration. As a result, the relay member (hence the seat) could pivot to a great extent upward, when the seat is unoccupied, to interfere with the seat and components arranged around the relay member, thereby to cause various inconveniences.

SUMMARY OF THE INVENTION

The object of the present invention is to provide an improved arrangement in an operator presence sensing apparatus of the type noted above, in which a seat unoccupied by the operator and a relay member are prevented from inadvertently pivoting to a great extent upward.

In order to fulfill the above-noted object, the present invention provides an operator presence sensing apparatus for a seat of a vehicle, comprising:

a base member for supporting the seat;

a pivot axis provided in the base member to extend in a transverse direction, the seat being pivotable about the pivot axis;

a relay member disposed between the base member and the seat to extend vertically, the relay member pivotably supported at one end thereof by the pivot axis and at the other end by the base member through a cushion spring;

a seat lift-up spring disposed between an underside of the seat and the base member for receiving part of the weight of the seat, the seat unoccupied by the operator being oscillated by the lift-up spring to a floating position lifted from the relay member;

an operator presence sensing switch for detecting the seat occupied by the operator and oscillated from the floating position to a lowered seated position; and a restricting device for restricting the relay member oscillating upwardly by action of the cushion spring when the seat is unoccupied by the operator.

With this arrangement, the restricting device does not allow the relay member to pivot beyond a predetermined range upward when the seat is not occupied by the operator, and thus the unoccupied seat is not pivoted beyond the predetermined range upward as well. This is effective to avoid the various inconveniences caused by an interference between the seat and components arranged around the relay member due to an extended upward swing of the relay member (hence the seat) when the operator is not seated.

In order to realize the restricting device in a simple and inexpensive way, it is primarily proposed to provide a stopper formed in the base member and a contacting cutout portion formed in the relay member for contacting the stopper.

It may be arranged that an upward oscillating force applied by the cushion spring to the relay member substantially balances with a downward oscillating force applied by the seat to the relay member when the relay member is in an oscillated position having the contacting cutout portion in contact with the stopper. Then, a large stress applied to the relay member from the cushion spring may be restrained when the operator leaves the seat.

In a preferred embodiment of the present invention, the operator presence sensing switch is a spool-type switch having a spool for contacting the seat to be projectable and retractable with oscillation of the seat, and a return spring, the switch being supported by the relay member, the switch and the seat lift-up spring being arranged opposite each other transversely of the relay member. With this arrangement, the weight of the seat applied to the relay member through the operator presence sensing switch when the operator is seated is balanced with the weight of the seat applied to the relay member through the lift-up spring in the transverse direction. As a result, a heavy load is not applied to only one side of the relay member.

It is also preferable to provide a deflection restricting device for restraining a free end of the relay member from being deflected transversely thereof. This arrangement effectively prevents an improper operation of the operator presence sensing switch resulting from a transverse deflection of the relay member.

Other features and advantages of the present invention will be apparent from the following detailed description of the preferred embodiments to be taken with reference to the accompanying drawings.

DESCRIPTION OF THE PREFERRED EMBODIMENT

Figure 1:
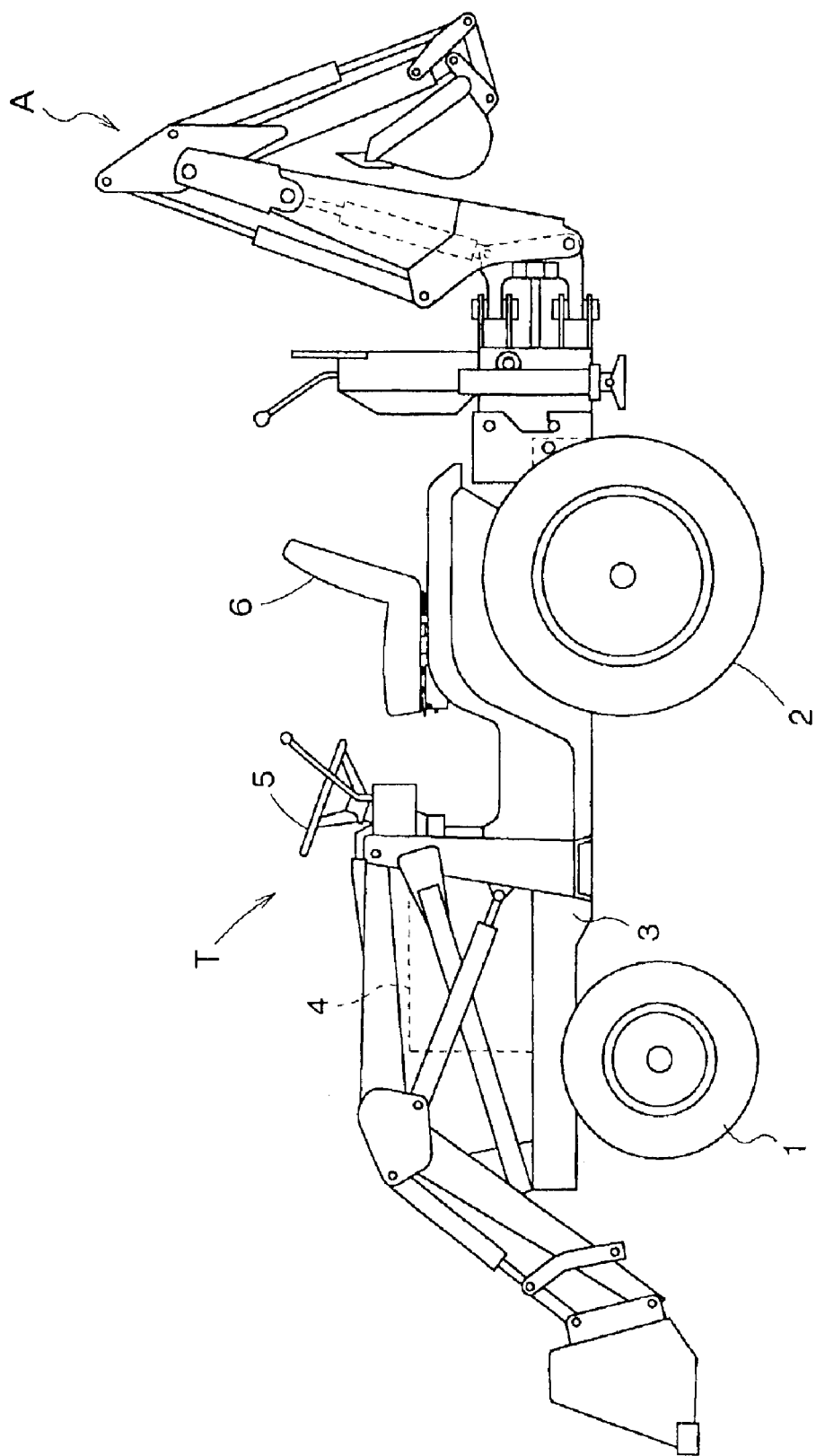
FIG. 1 is a side elevation of a tractor with a loader and a backhoe, employing an operator presence sensing apparatus according to the present invention.

FIG. 1 shows a tractor T exemplifying a working vehicle and including a right and left pair of dirigible front wheels 1, a right and left pair of rear drive wheels 2, and a body frame 3 having the front and rear wheels. The body frame 3 has, mounted on a front portion thereof, an engine 4 and a steering wheel 5 for steering the front wheels 1. A driver's seat 6 is mounted on a rear portion of the vehicle frame 3. The tractor T is a working vehicle referred to as a TLB and further includes a hydraulically operable backhoe assembly A mounted rearwardly thereof and a hydraulically operable loader assembly mounted forwardly thereof. The backhoe assembly A and loader assembly are operable through a hydraulic apparatus actuated by the engine of the tractor T.

Referring to FIGS. 2 through 5, the driver's seat 6 is mounted on a base member including a right and left pair of fixed rails 7 and a right and left pair of movable rails 8 supported on the fixed rails 7 to be positionally variable and fixable in a longitudinal direction. The movable rails 8 include a bracket 8a disposed forwardly thereof and having a pivot axis X extending transversely of the body frame. The driver's sheet 6 is pivotable about the pivot axis X.

As shown in FIGS. 2 through 5, a plate-like relay member 9 is disposed under one lateral side of the driver's seat 6 to be vertically pivotable about the pivot axis X. That is to say, the relay member 9 is disposed between the driver's seat 6 and one of the movable rails 8.

The movable rails 8 include a cushion device for resiliently receiving the driver's seat 6 when a seating load is applied to the driver' seat 6 (i.e. when the operator is seated). The cushion device has a first cushion spring 10 in the form of a coil spring disposed on one of the movable rails 8, and a second cushion spring 11 in the form of a coil spring disposed on the other movable rail 8. The first cushion spring 10 resiliently supports the driver' seat 6 and relay member 9 to be oscillatable in unison with the operator being seated. The second cushion spring 11 resiliently supports only the driver's seat 6 to be oscillatable with the operator being seated.

A seat lift-up spring 12 is disposed between the driver's seat 6 and relay member 9 for oscillating (floating) the driver's seat 6 upward from the relay member 9 supported by the first cushion spring 10 when the seating load is removed from the driver's seat 6. The seat lift-up spring 12 is attached to the relay member 9.

The relay member 9 has an operator presence sensing switch 13 acting as part of an operator presence sensing apparatus. The switch 13 is operable to ON when detecting that the driver's seat 6 is oscillated downward against the seat lift-up spring 12 to move beyond a predetermined range toward the relay member 9, i.e. that the operator is present on the driver's seat 6.

The operator presence sensing switch 13 includes a main body 13a attached to the relay member 9, a spool 13b projectable and retractable relative to the main body 13a and acting as an operating element, and a return spring 13c for biasing the spool 13b in a projecting direction.

When the seating load is removed from the driver's seat 6 (i.e. when the operator leaves the seat), the spool 13b projects upward from the switch main body 13a. When the seating load is applied to the driver's seat 6 to move the driver's seat 6 beyond the predetermined range toward the relay member 9, the spool 13b is retracted by the driver's seat 6 into the main body 13a against the return spring 13c.

In this embodiment, the return spring 13c for biasing the spool 13b in the projecting direction is provided separately from the seat lift-up spring 12. Instead, the return spring 13c may act also as the seat lift-up spring 12.

In order to avoid a heavy load acting on the main body 13a of the operator presence sensing switch 13 when the seating lead is applied to the driver's seat 6 (i.e. when the operator is seated), part of the driver's seat 6 contacts part of the relay member 9 before the spool 13b is depressed to the lower limit by the driver's seat 6.

The operator presence sensing apparatus includes a restricting device for restricting the relay member 9 being oscillated upward by action of the first cushion spring 10 when the seating load removed from the driver's seat 6 (i.e. when the seat is not occupied by the operator).

The restricting device restricts the relay member 9 by bringing a first bent piece 14 of the relay member 9 into contact with an upper edge 15a of a cutout 15 formed in the bracket 8a of the movable rails 8. The upper edge 15a functions as a stopper for the first bent piece 14 acting as a contact portion, hence for the relay member 9. A restriction of downward oscillation of the relay member 9 is realized when the cushion spring 10 reaches its compressed limit.

Figure 2:
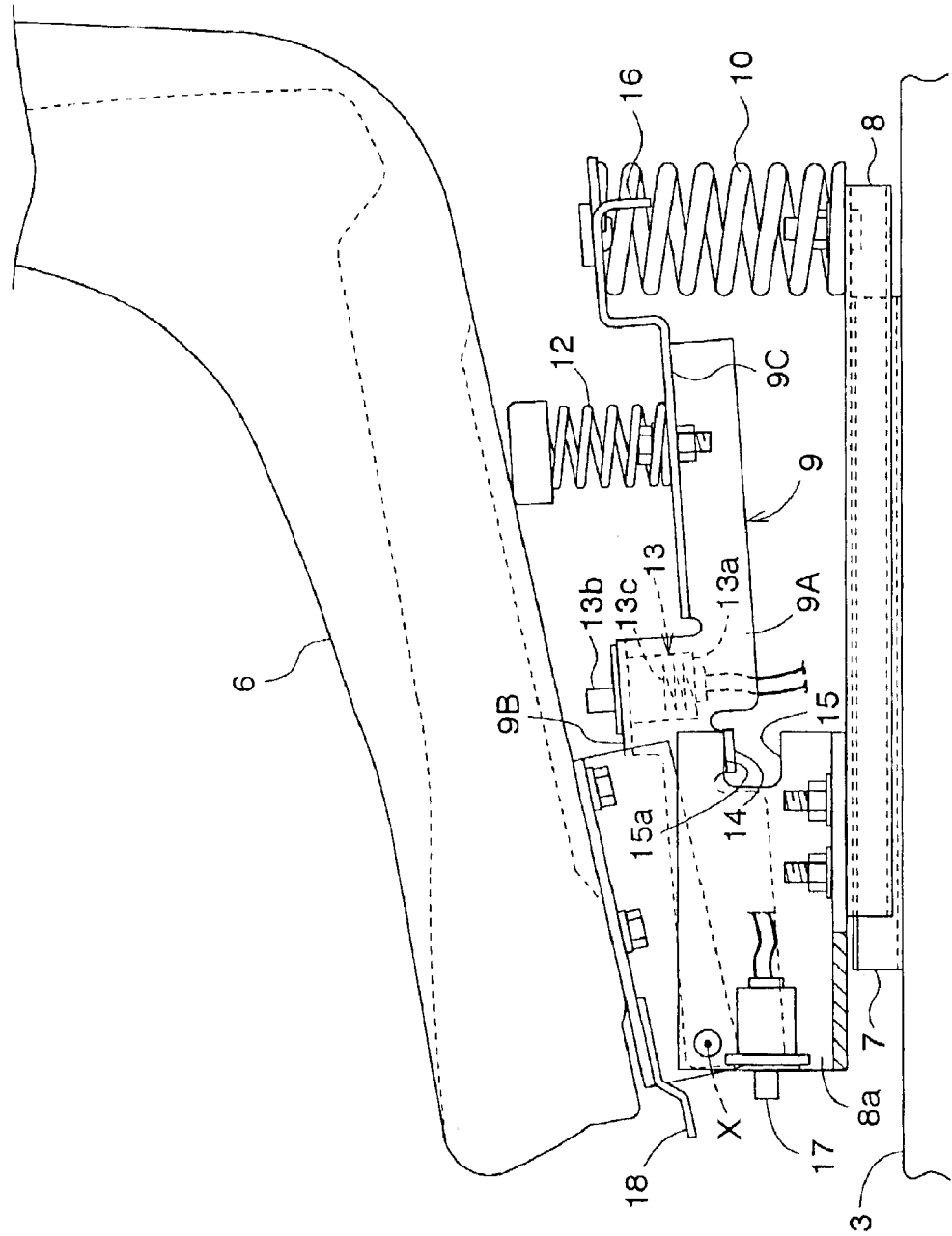
FIG. 2 is a cut-away side view of a seat supporting portion with the operator absent from a seat.
Figure 3:
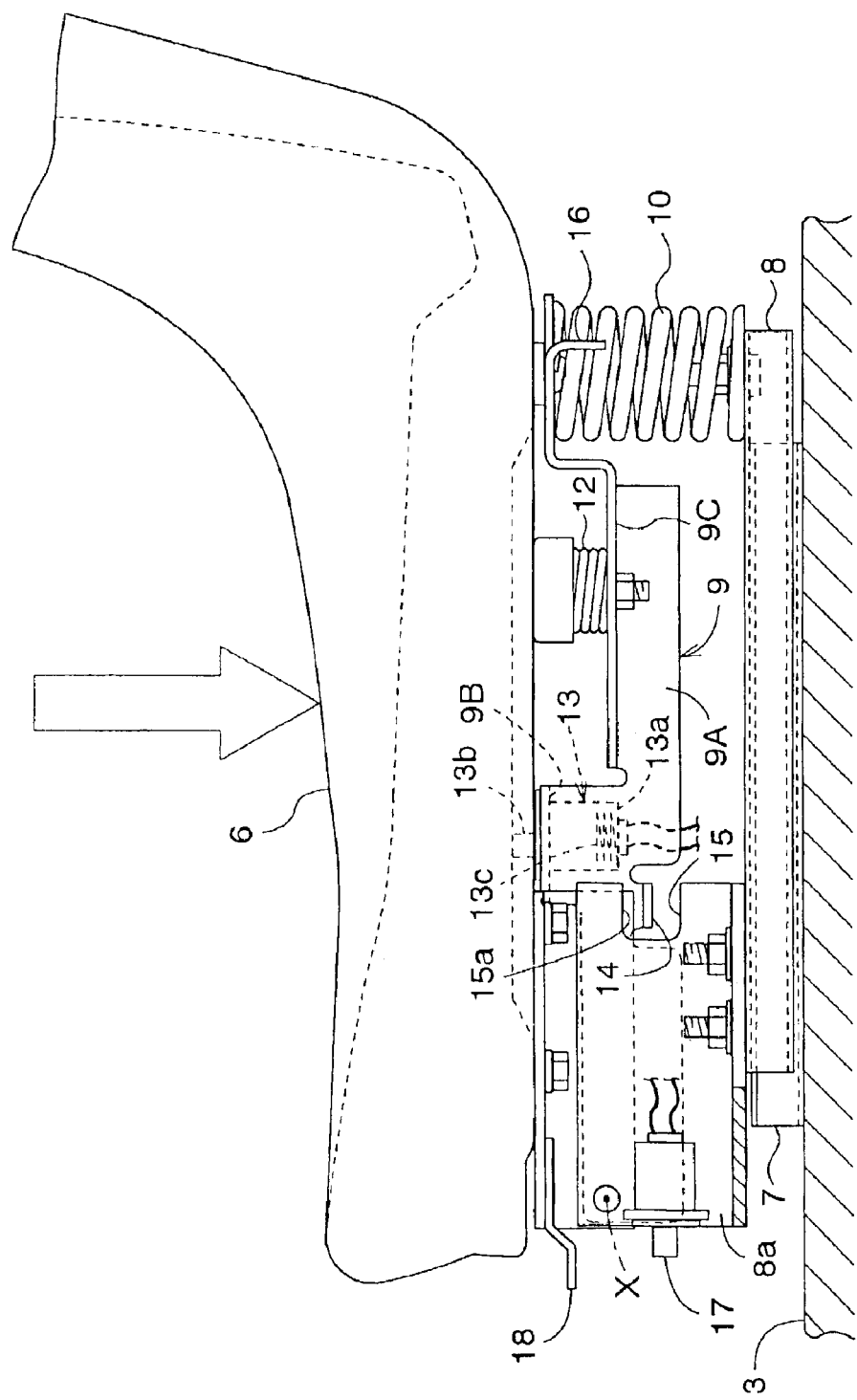
FIG. 3 is a cut-away side view of the seat supporting portion with the operator present on the seat.
Figure 4:
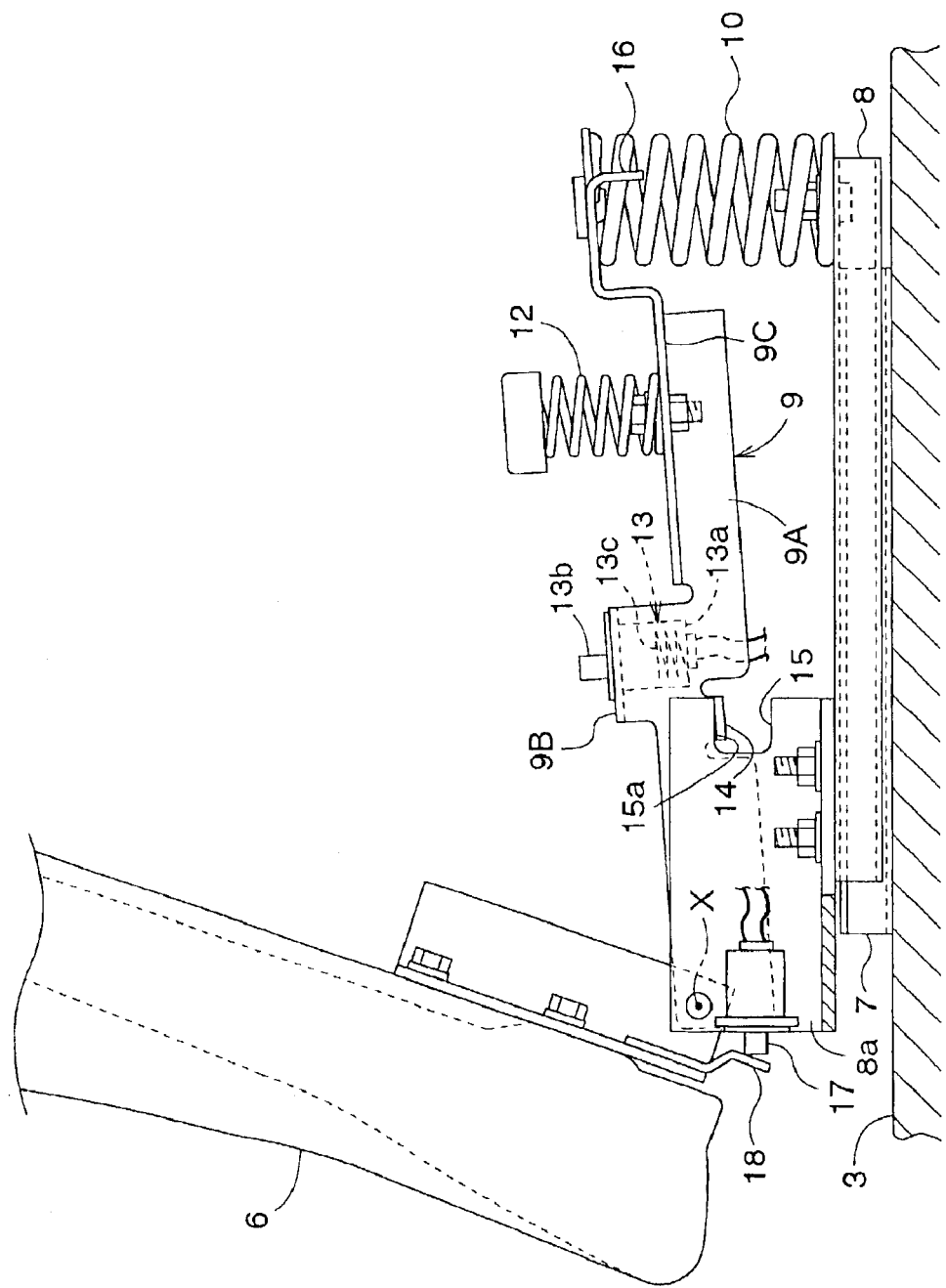
FIG. 4 is a cut-away side view of the seat supporting portion with the seat pivoted upward.
Figure 5:
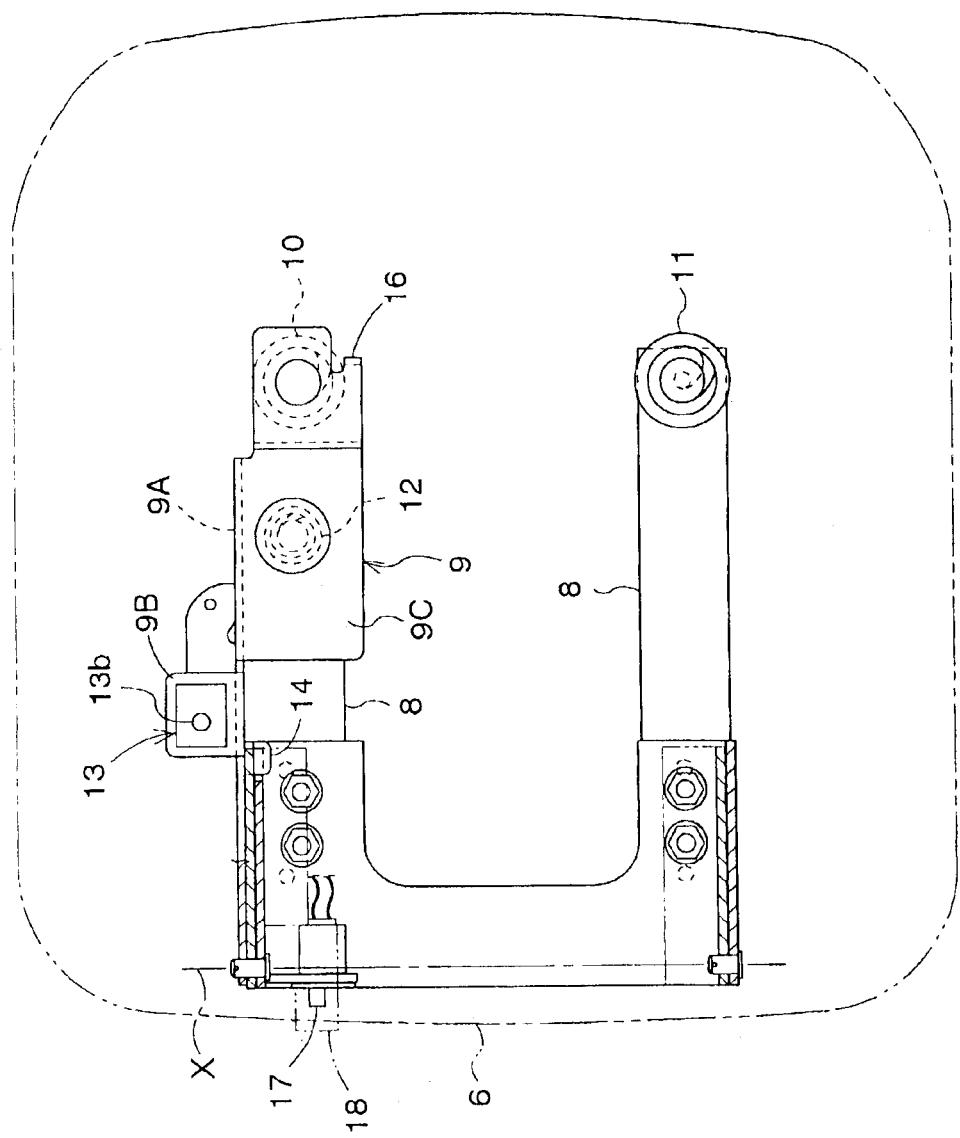
FIG. 5 is a plan view of the seat supporting portion.

In this embodiment, the apparatus is designed such that an upward oscillating force applied by the first cushion spring 10 to the relay member 9 substantially balances with a downward oscillation force resulting from the weight of the driver's seat 6 and the like and applied to the relay member 9 when the relay member 9 is in an oscillated position having the first bent piece 14 in contact with the upper edge 15a of the cutout 15 (see FIG. 2).

The operator presence sensing apparatus further includes a deflection restricting device for restraining a free end of the relay member 9 from being deflected transversely of the body frame. The deflection restricting device restricts movement of the relay member 9 in one transverse direction by bringing a second bent piece 16 of the relay member 9 into contact with the cushion spring 10, while restricting movement of the relay member 9 in the opposite transverse direction by bringing the relay member 9 into contact with a lateral surface of the movable rail 8.

Figure 6:
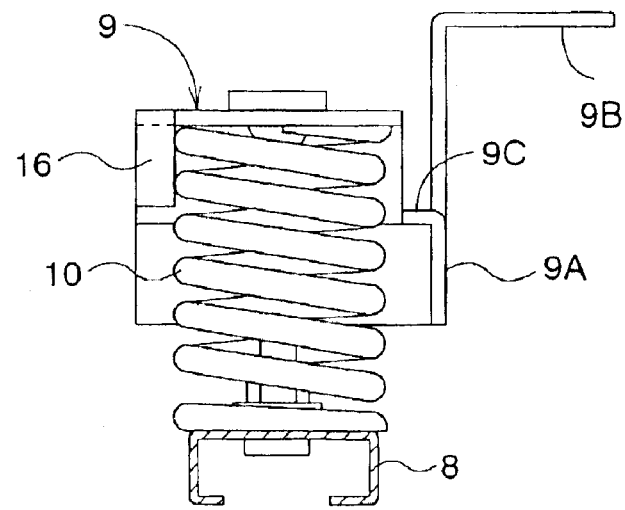
FIG. 6 a rear view of a principal portion of a stay.
Figure 7:
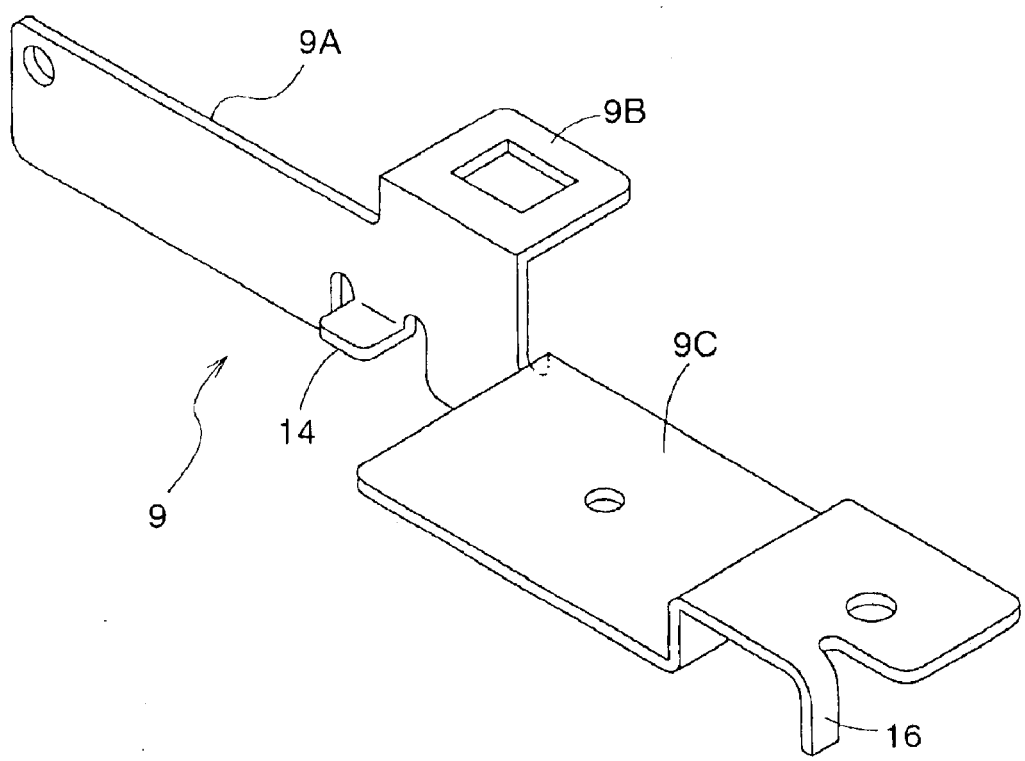
FIG. 7 is a perspective view of the stay.

In order to prevent the relay member 9 consisting of a vertically extending plate from falling down transversely of the body frame, the seat lift-up spring 12 and the operator presence sensing switch 13 are arranged at opposite sides across the main body of the relay member 9 as shown also in FIGS. 6 and 7. Specifically, a mounting seat 9B for the operator presence sensing switch 13 is bent from, as an integral part of, the plate-like main body 9A of the relay member 9 which is vertically pivotable about the pivot axis X. Thus, the mounting seat 9B projects in one transverse direction. A spring receiver 9C is bent from, as an integral part of, the main body 9A to project in the opposite transverse direction. The horizontal bent pieces 9B and 9C receive the operator presence sensing switch 13 and seat lift-up spring 12, respectively.

This embodiment also employs an alignment switch 17 to be pressed by a control piece 18 formed as an integral part of the driver's seat 6. The switch 17 is reversibly operable to ON when the driver's seat 6 is pivoted forward to a tilted position.

Next, an engine start and stop circuit will be described.

Figure 8:
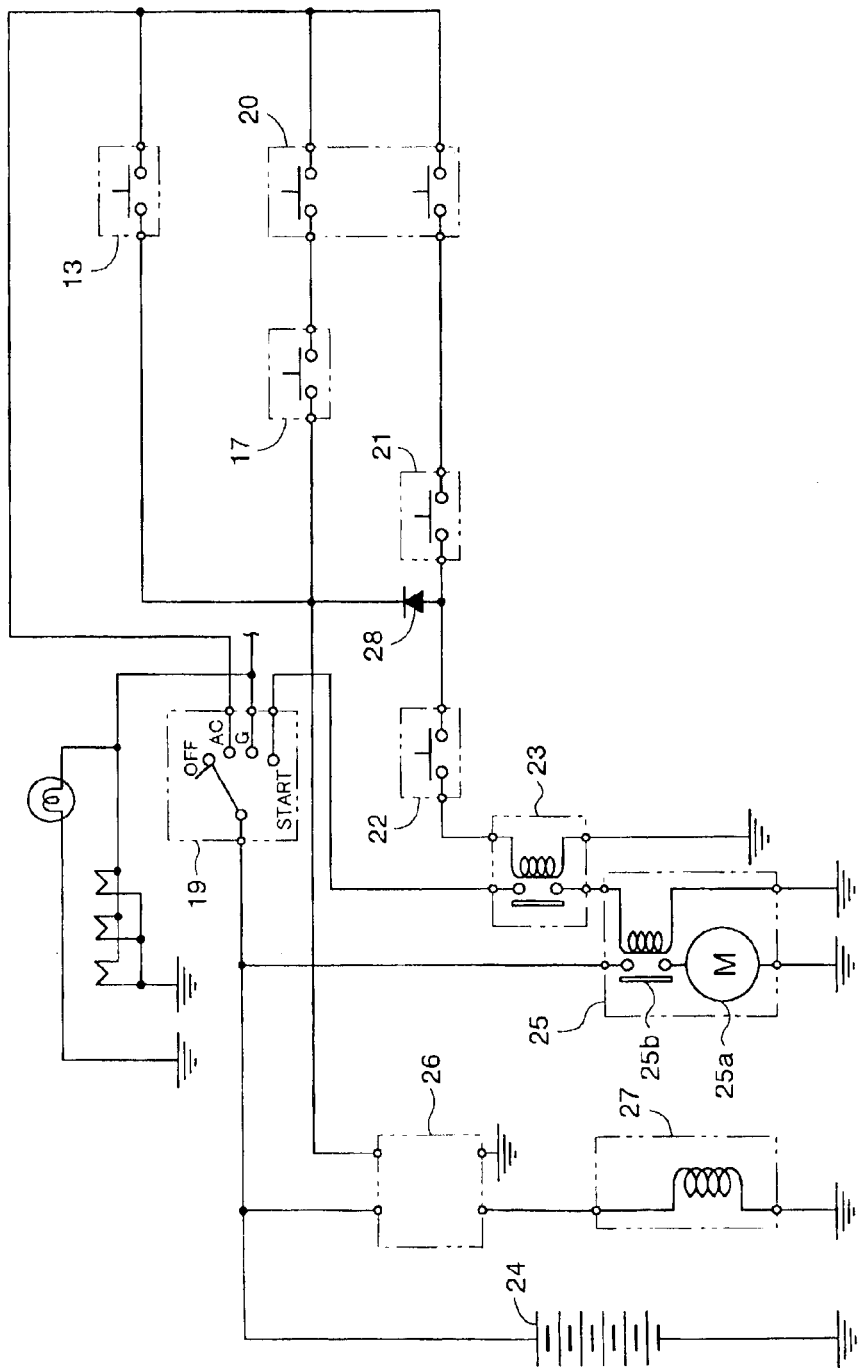
FIG. 8 is an electric circuit diagram.

As shown in FIG. 8, the engine start and stop circuit operates a starter 25 with a battery 24 through a starter relay 23, and a fuel cutting stop solenoid 27 through a key stop timer 26, in response to conditions of a main switch 19, the operator presence sensing switch 13, alignment switch 17, propelling change speed switches 20 operable to ON only when a propelling change speed device (not shown) is in neutral, an implement switch 21 operable to ON only when an implement change speed device (not shown) disposed on a transmission line extending to a rear PTO shaft is in neutral, and a propelling clutch switch 22 operable to ON when a propelling clutch (not shown) is engaged.

The propelling change speed switches 20 consist of two switches. The starter 25 includes a drive motor 25*a* and motor relay 25*b*. The key stop timer 26 energizes the stop solenoid 27 for a predetermined period of time when an applied signal voltage is low, while de-energizing it when the applied signal voltage is high.

When the main switch 19 is operated to a start position with all of the propelling change speed switches 20, implement switch 21 and propelling clutch switch 22 turned ON, a high voltage signal is applied to the key stop timer 26 through a diode 28 to prevent the stop solenoid 27 from being energized. On the other hand, the starter relay 23 is excited to excite in turn the motor relay 25*b* and energize the motor 25*a*, thereby to start the engine 4. It should be noted that the engine may be started whether the operator presence sensing switch 13 and alignment switch 17 are ON or OFF. Accessories AC are maintained in energized state even when the main switch 19 is operated to the start position.

When any one of the operator presence sensing switch 13, alignment switch 17, propelling change speed switches 20 and implement switch 21 is maintained ON with the main switch 19 returned to an accessory position after the engine is started, the signal voltage applied to the key stop timer 26 is maintained high, whereby the engine 4 continues running.

On the other hand, with the engine running, when the operator presence sensing switch 13 is turned OFF and also the propelling change speed switches 20 are turned OFF, or when the operator presence sensing switch 13 is turned OFF while the propelling change speed switches 20 are turned ON and further the implement switch 21 is turned OFF, the voltage applied to the key stop timer 26 becomes low to excite the stop solenoid 27, thereby to stop the engine 4 automatically.

Needless to say, when, with the engine 4 running based on the operator presence sensing switch 13 operated to ON, the alignment switch 17 is operated to ON with the propelling change speed switch 20 being ON, the engine 4 is maintained in the running state. In other words, the operator may alight from the tractor with the engine 4 running to driven the rear PTO. As a result, the operator having alighted from the tractor may operate and control the backhoe assembly A.

As set forth above, the engine is started on condition that the change speed switches 20 are ON and the implement switch 21 is ON and the propelling clutch switch 22 is ON.

The engine is stopped on condition that (a) the operator presence sensing switch 13 is OFF and the propelling change speed switches 20 are OFF.

The engine is stopped even when the propelling switches 20 are ON, that is to say, when the change speed device is in neutral on condition that (b) the operator presence sensing switch 13 is OFF and the implement switch 21 is OFF.

[Alternative Embodiment]

Figure 9:
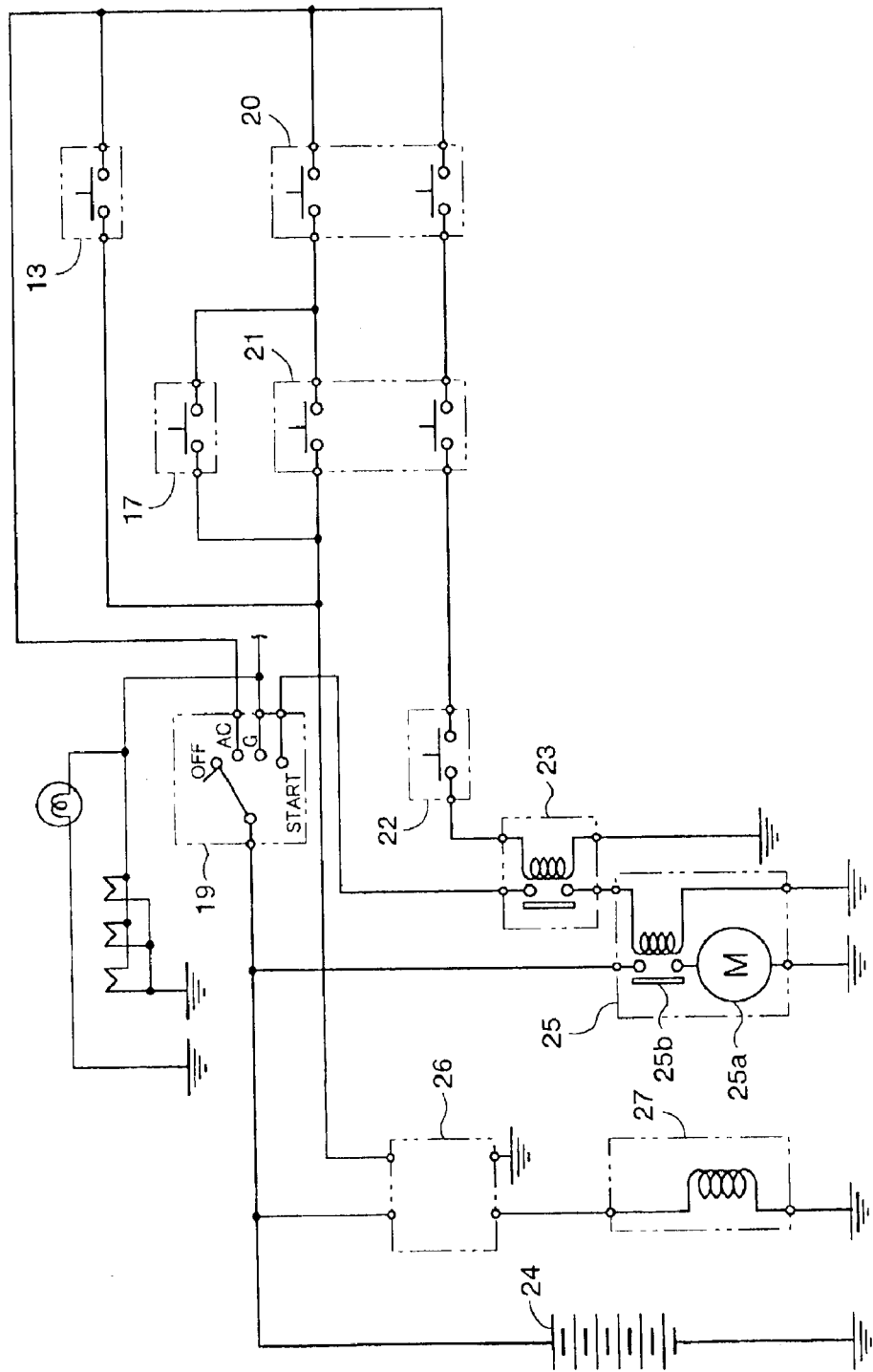
FIG. 9 is an electric circuit diagram showing another embodiment.

FIG. 9 shows a modified engine start and stop circuit of the foregoing embodiment.

More particularly, two implement switches 21 are provided instead of the diode 28. One of the implement switches 21 is arranged in the same manner as in the preceding embodiment, while the other implement switch 21 is connected parallel to the alignment switch 17. The engine start and stop circuit of the alternative embodiment has the same functions as in the preceding embodiment, and a further description is omitted.

What is claimed is:

1. An operator presence sensing apparatus for a seat of a vehicle, comprising:

a base member for supporting the seat;

a pivot axis provided in the base member to extend in a transverse direction, the seat being pivotable about the pivot axis;

a relay member disposed between the base member and the seat to extend vertically, the relay member pivotably supported at one end thereof by the pivot axis and at the other end by the base member through a cushion spring;

a seat lift-up spring disposed between an underside of the seat and the base member for receiving part of the weight of the seat, the seat unoccupied by the operator being oscillated by the lift-up spring to a floating position lifted from the relay member;

an operator presence sensing switch for detecting the seat occupied by the operator and oscillated from the floating position to a lowered seated position; and a restricting device for restricting upward oscillation of the relay member occurring by action of the cushion spring when the seat is unoccupied by the operator.

2. An apparatus as claimed in claim 1, wherein said restricting device includes a stopper formed in the base member, and a contacting portion formed in the relay member for contacting the stopper from below when the relay member is oscillated upwardly.

3. An apparatus as claimed in claim 2, wherein an upward oscillating force applied by the cushion spring to the relay member substantially balances with a downward oscillating force applied by the seat to the relay member when the relay member is in an oscillated position having the contacting portion in contact with the stopper.

4. An apparatus as claimed in claim 1, wherein the operator presence sensing switch is a spool-type switch having a spool for contacting the seat to be projectable and retractable with oscillation of the seat, and a return spring, the switch being supported by the relay member, the switch and the seat lift-up spring being arranged opposite each other transversely of the relay member.

5. An apparatus as claimed in claim 4, wherein said relay member consists of a vertical extending plate having a first horizontal piece extending in one direction to support the operator presence sensing switch, and a second horizontal piece extending in a direction opposite to said one direction to support the seat lift-up spring.

6. An apparatus as claimed in claim 1, further comprising a deflection restricting device for restraining a free end of the relay member from being deflected transversely thereof.

* * * * *